US008924705B1

(12) United States Patent
Markov et al.

(10) Patent No.: US 8,924,705 B1
(45) Date of Patent: Dec. 30, 2014

(54) METHOD AND DETECTION SYSTEM FOR DETECTING ENCRYPTED PEER-TO-PEER (EP2P) SESSIONS ASSOCIATED WITH A PARTICULAR EP2P NETWORK

(75) Inventors: Andriy Markov, Ottawa (CA); Dmytro Kukulniak, Yalta (UA); Bogdan Materna, Ottawa (CA)

(73) Assignee: ReVera Systems, Granite Bay, CA (US)

( * ) Notice: Subject to any disclaimer, the term of this patent is extended or adjusted under 35 U.S.C. 154(b) by 261 days.

(21) Appl. No.: 13/243,930

(22) Filed: Sep. 23, 2011

Related U.S. Application Data

(60) Provisional application No. 61/386,059, filed on Sep. 24, 2010, provisional application No. 61/386,063, filed on Sep. 24, 2010, provisional application No. 61/386,068, filed on Sep. 24, 2010, provisional application No. 61/386,074, filed on Sep. 24, 2010.

(51) Int. Cl.
H04L 29/06 (2006.01)
(52) U.S. Cl.
CPC ........... *H04L 63/145* (2013.01); *H04L 63/1416* (2013.01); *H04L 69/22* (2013.01)
USPC ............................................ 713/150; 726/13
(58) Field of Classification Search
USPC ................... 713/150; 726/1, 11, 13
See application file for complete search history.

(56) References Cited

U.S. PATENT DOCUMENTS

| 7,646,728 | B2 | 1/2010 | Fahmy | 370/252 |
| 7,958,250 | B2 | 6/2011 | Sridhar et al. | 709/230 |
| 2002/0152373 | A1* | 10/2002 | Sun et al. | 713/150 |
| 2006/0068806 | A1 | 3/2006 | Nam et al. | 455/452.2 |
| 2009/0150972 | A1* | 6/2009 | Moon et al. | 726/1 |
| 2009/0299937 | A1 | 12/2009 | Lazovsky et al. | 706/47 |
| 2010/0064362 | A1 | 3/2010 | Materna et al. | 726/15 |
| 2010/0138382 | A1* | 6/2010 | Nagoya et al. | 707/609 |
| 2010/0145912 | A1 | 6/2010 | Li et al. | 707/622 |
| 2011/0153809 | A1 | 6/2011 | Ghanem et al. | 709/224 |

OTHER PUBLICATIONS

O'Neil, S., "Skype Library RC4 v1.109", http://cryptolib.com/ciphers/skype/skype_rc4.c, published Jul. 7, 2010, accessed Sep. 22, 2011.
Hjelmvik, E. and John, W., "Breaking and Improving Protocol Obfuscation", Department of Computer Science and Engineering, Chalmers University of Technology, Technical Report No. 2010-05, ISSN 1652-926X, Sweden, Jul. 27, 2010.

* cited by examiner

*Primary Examiner* — Kambiz Zand
*Assistant Examiner* — Abiy Getachew
(74) *Attorney, Agent, or Firm* — Matthew A. Pequignot; Pequignot + Myers LLC

(57) ABSTRACT

A method and a detection system are provided for detecting encrypted peer-to-peer (EP2P) sessions associated with a particular EP2P network. Seed data associated with the EP2P network is extracted from a selected packet, and an encryption seed is obtained from the seed data. An encryption key is obtained from the encryption seed by using a key function associated with the EP2P network, and a cipher associated with the EP2P network is initialized with the encryption key. A portion or whole of the packet is decrypted, and checksum data associated with the EP2P network is extracted. A checksum is obtained from the checksum data, and the obtained checksum is compared with a reference checksum associated with the EP2P network. If the obtained checksum matches the reference checksum, a session including the packet is determined to be an EP2P session associated with the EP2P network.

17 Claims, 8 Drawing Sheets

METHOD AND DETECTION SYSTEM FOR DETECTING ENCRYPTED PEER-TO-PEER (EP2P) SESSIONS ASSOCIATED WITH A PARTICULAR EP2P NETWORK

CROSS-REFERENCE TO RELATED APPLICATIONS

The present invention claims priority from U.S. Patent Application Ser. No. 61/386,059 to Materna, et al., filed on Sep. 24, 2010, from U.S. Patent Application Ser. No. 61/386,063 to Materna, et al., filed on Sep. 24, 2010, from U.S. Patent Application Ser. No. 61/386,068 to Materna, et al., filed on Sep. 24, 2010, and from U.S. Patent Application Ser. No. 61/386,074 to Materna, et al., filed on Sep. 24, 2010, which are incorporated herein by reference.

REFERENCE TO A COMPUTER PROGRAM LISTING APPENDIX

A computer program listing appendix is submitted herewith via the United States Patent Office Electronic Filing System. All of the material submitted herewith is incorporated herein by reference. The computer program listing appendix includes four files. The names, dates of creation, and sizes in bytes of the files are as follows: 1) rc4_gen_c.txt, Sep. 22, 2011, 149,812; 2) sky_rc4seeder_c.txt, Sep. 22, 2011, 649,212; 3) sky_rc4seeder_h.txt, Sep. 22, 2011, 134,364; and 4) sky_types_h.txt, Sep. 22, 2011, 160,241.

File 1) is the source code of the demonstration program, in .txt format. The program demonstrates the usage of Skype compatible key generation. The input attributes are a seed in the form of a 32-byte hexadecimal integer (0xaabbccddee) and an optional file containing a salt (80 bytes). The output is a key that could be used for RC4 initialization. File 2) is the source code of the Skype compatible implementation of the seed based key generation function, also referred to herein as the key function, in .txt format. File 3) is the source code of the header file defining key generation function prototype, in .txt format. File 4) is the source code of the header file defining types used by the key generation function, in .txt format.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

The present invention relates to methods and detection systems for detecting encrypted peer-to-peer (EP2P) sessions. More particularly, the present invention relates to methods and detection systems for detecting EP2P sessions associated with a particular EP2P network.

BACKGROUND OF THE INVENTION

The explosive growth in the popularity of peer-to-peer (P2P) networks has created virtual communities of millions of people who communicate through the use of instant messaging, file transfer, as well as voice and video communications.

P2P networks include a plurality of P2P nodes that are, generally, peers. Peers make a portion of their resources, such as processing power, disk storage, or network bandwidth, directly available to other peers. In a pure P2P network, there is no need for central coordination, for example, by a central server. Peers may act both as suppliers of resources, or servers, and as consumers of resources, or clients. P2P nodes may be dynamically added or removed from P2P networks, and connections between P2P nodes are largely ad hoc. P2P networks are, generally, implemented as application-layer overlay networks over the physical-layer internet protocol (IP) network. Overlay networks allow indexing and peer discovery, while content is, typically, exchanged directly over the underlying IP network.

For added security, many P2P networks use encryption, and such networks are referred to as encrypted peer-to-peer (EP2P) networks. For example, the EP2P sessions carried on EP2P networks may be encrypted by randomizing portions of EP2P packets. Often, the EP2P sessions carried on EP2P networks are also obfuscated, for example, by inserting padding into EP2P packets. Therefore, EP2P networks pose substantial challenges to organizations tasked with detecting, intercepting, mapping, and blocking unauthorized communications, such as governments, corporate enterprises, intelligence organizations, lawful intercept entities, and censorship organizations.

With reference to FIG. 1A, a typical EP2P network 100 includes a plurality of EP2P nodes 101, 102, and 103 that are, generally, peers. Typically, the nodes 101, 102, and 103 include directory nodes 101, relay nodes 102, and general nodes 103. In some instances, the EP2P network 100 also includes a certificate authority or key server 104, which provides user authentication services. The directory nodes 101, which have listings of EP2P nodes 101, 102, and 102, route the EP2P sessions carried on the EP2P network 100, and the relay nodes 102 relay the EP2P sessions between the general nodes 103.

The EP2P sessions carried on the EP2P network 100 include EP2P packets having the same source IP address and port number combination, destination IP address and port number combination, and transport protocol. An exemplary user datagram protocol (UDP) EP2P packet 105 and an exemplary transmission control protocol (TCP) EP2P packet 106 are illustrated in FIG. 1B. In some instances, a TCP key exchange packet 107 is used in conjunction with the TCP EP2P packet 106.

It is, generally, difficult to detect EP2P sessions associated with EP2P networks. EP2P networks do not provide a static association between the IP address and port number combination of a client and the unique client identifier (ID). Users of EP2P networks are highly mobile and may use clients from various geographically dispersed locations, such as their homes, workplaces, or hotels. Consequently, it is not possible to detect EP2P sessions solely on the basis of IP address and port number combinations.

It is also difficult to detect EP2P sessions by pattern matching methods. For example, in the pattern matching method described in U.S. Pat. No. 7,646,728 to Fahmy, issued on Jan. 12, 2010, which is incorporated herein by reference, portions of P2P packets are compared to patterns associated with particular P2P networks. However, as the contents of EP2P packets are, typically, randomized through encryption, patterns cannot be matched without first decrypting EP2P packets.

EP2P sessions may be detected by traffic analysis methods. For example, as described in U.S. Patent Application Publication No. 2006/0068806 to Nam, et al., published on Mar. 30, 2006, and in U.S. Patent Application Publication No. 2010/0145912 to Li, et al., published on Jun. 10, 2010, which are incorporated herein by reference, connection patterns may be analyzed to detect EP2P sessions. However, traffic analysis methods, which do not consider the contents of EP2P packets, are prone to high false-positive ratios and are, typically, unable to detect EP2P sessions associated with a particular EP2P network.

SUMMARY OF THE INVENTION

Accordingly, the present invention relates to methods and detection systems for detecting encrypted peer-to-peer (EP2P) sessions associated with a particular EP2P network.

One aspect of the present invention relates to a detection system for detecting EP2P sessions associated with a particular EP2P network, embodied in one or more non-transitory computer-readable storage media and executable by one or more processors, comprising: one or more detection agents, each detection agent including: a filter unit for receiving a plurality of packets on route from a plurality of sources to a plurality of destinations in an internet protocol (IP) network, and for selecting a particular packet from the plurality of packets on the basis of a predetermined criterion; a decryption unit for receiving the particular packet, for extracting seed data associated with the particular EP2P network from the particular packet, for obtaining an encryption seed from the extracted seed data, for obtaining an encryption key from the obtained encryption seed with a key function associated with the particular EP2P network, for initializing a cipher associated with the particular EP2P network with the obtained encryption key, and for decrypting a portion or whole of the particular packet with the initialized cipher; and an EP2P detection unit for receiving the decrypted portion or whole of the particular packet from the decryption unit, for extracting checksum data associated with the particular EP2P network from the decrypted portion or whole of the particular packet, for obtaining a checksum from the extracted checksum data, for comparing the obtained checksum with a reference checksum associated with the particular EP2P network, and for determining that a session including the particular packet is an EP2P session associated with the particular EP2P network if the obtained checksum matches the reference checksum.

Another aspect of the present invention relates to a method of detecting EP2P sessions associated with a particular EP2P network, executed by one or more processors, comprising: 1) receiving a plurality of packets on route from a plurality of sources to a plurality of destinations in an IP network; 2) selecting a particular packet from the plurality of packets on the basis of a predetermined criterion; 3) extracting seed data associated with the particular EP2P network from the particular packet; 4) obtaining an encryption seed from the extracted seed data; 5) obtaining an encryption key from the obtained encryption seed by using a key function associated with the particular EP2P network; 6) initializing a cipher associated with the particular EP2P network by using the obtained encryption key; 7) decrypting a portion or whole of the particular packet by using the initialized cipher; 8) extracting checksum data associated with the particular EP2P network from the decrypted portion or whole of the particular packet; 9) obtaining a checksum from the extracted checksum data; 10) comparing the obtained checksum with a reference checksum associated with the particular EP2P network; and 11) determining that a session including the particular packet is an EP2P session associated with the particular EP2P network if the obtained checksum matches the reference checksum.

Another aspect of the present invention relates to one or more non-transitory computer-readable storage media comprising instructions that, when executed by one or more processors, perform a method of detecting EP2P sessions associated with a particular EP2P network, executed by one or more processors, the method comprising: 1) receiving a plurality of packets on route from a plurality of sources to a plurality of destinations in an IP network; 2) selecting a particular packet from the plurality of packets on the basis of a predetermined criterion; 3) extracting seed data associated with the particular EP2P network from the particular packet; 4) obtaining an encryption seed from the extracted seed data; 5) obtaining an encryption key from the obtained encryption seed by using a key function associated with the particular EP2P network; 6) initializing a cipher associated with the particular EP2P network by using the obtained encryption key; 7) decrypting a portion or whole of the particular packet by using the initialized cipher; 8) extracting checksum data associated with the particular EP2P network from the decrypted portion or whole of the particular packet; 9) obtaining a checksum from the extracted checksum data; 10) comparing the obtained checksum with a reference checksum associated with the particular EP2P network; and 11) determining that a session including the particular packet is an EP2P session associated with the particular EP2P network if the obtained checksum matches the reference checksum.

BRIEF DESCRIPTION OF THE DRAWINGS

The present invention will be described in greater detail with reference to the accompanying drawings wherein.

DETAILED DESCRIPTION OF THE INVENTION

The present invention provides methods and detection systems for detecting encrypted peer-to-peer (EP2P) sessions associated with a particular EP2P network. The methods and detection systems described herein may also be used for controlling and managing EP2P sessions associated with the particular EP2P network.

Figure 2:
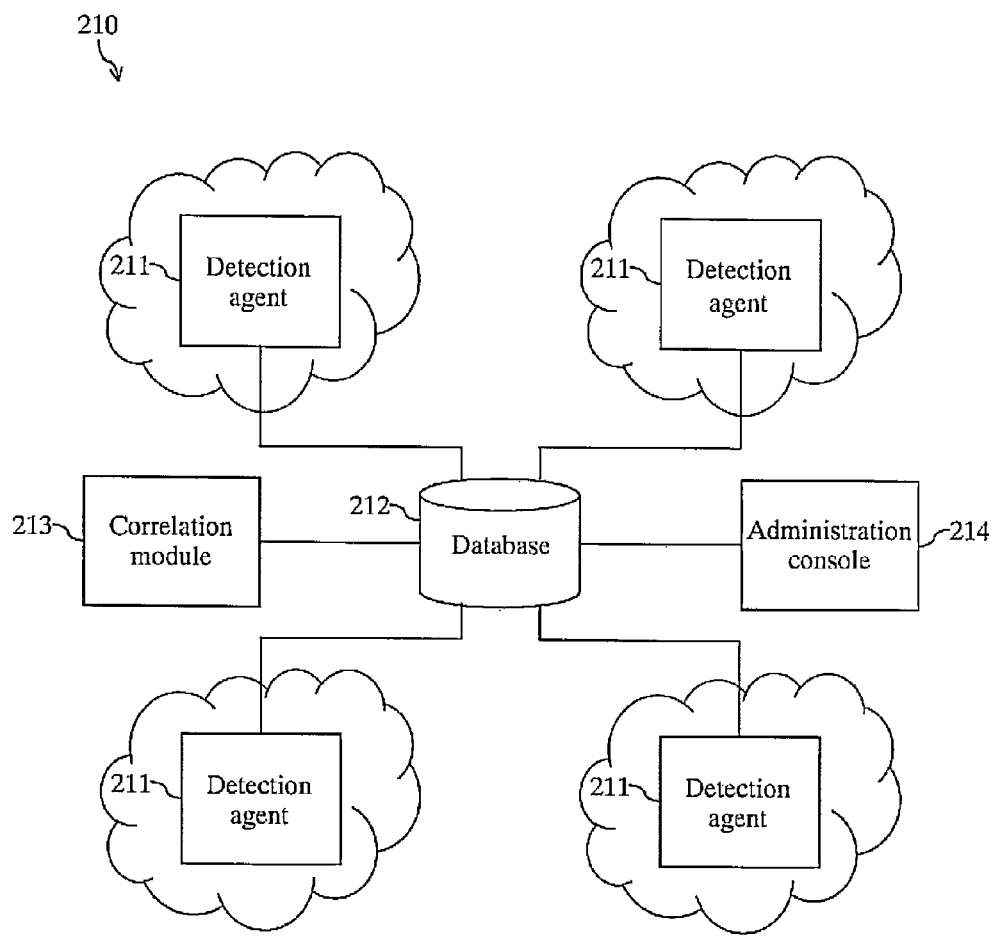
FIG. 2 is a schematic illustration of a detection system according to the present invention.

With reference to FIG. 2, the detection system 210 includes one or more detection agents 211. Typically, the detection system 210 also includes a database 212. Preferably, the detection system 210 is a distributed detection system 210 including a plurality of detection agents 211, a correlation module 213, an administration console 214, and a centralized database 212 accessible by the plurality of detection agents 211, the correlation module 213, and the administration console 214. Advantageously, such a distributed detection system 210 may be scaled for use in small to very large environments.

The detection system 210 may be implemented as hardware, software, or a combination of hardware and software. Typically, the detection system 210 is embodied in one or more non-transitory computer-readable storage media, and the method carried out by the detection system 210 is performed by one or more processors. That is, typically, each detection agent 211, the database 212, the correlation module 213, and the administration console 214 are embodied in non-transitory computer-readable storage media, and the actions carried out by each detection agent 211, the database 212, the correlation module 213, and the administration console 214 are executed by a processor.

The non-transitory computer-readable storage media may be any media that are able to store computer-executable instructions and that are able to be accessed by a computer including a processor. For example, the non-transitory computer-readable storage media may include a magnetic storage device, such as a hard disk, a floppy disk, or a flash memory, or an optical storage device, such as a compact disc (CD), a digital video disc (DVD), or a blu-ray disc (BD).

Preferably, the detection system 210 is implemented as software embodied in one or more non-transitory computer readable storage media and executable by one or more processors of one or more computers dedicated to network packet processing. The computers, generally, each include a network card, a hard disk, and an operative memory, in addition to a processor in the form of a central processing unit (CPU). Preferably, separate distributed computers are used for each detection agent 211, and a central computer is used for the database 212, the correlation module 213, and the administration console 214. In some instances, the distributed computers used for each detection agent 211 also include a local database.

The detection agent 211 enables the detection of EP2P sessions associated with a particular EP2P network, the decryption of EP2P packets associated with the particular EP2P network included in the detected EP2P sessions, and the collection of EP2P session information for the detected EP2P sessions. In various embodiments, the detection agent 211 also enables the collection of EP2P command information and EP2P node information from the detected EP2P sessions, and/or the selective blocking and/or prioritization of the detected EP2P sessions.

Generally, each detection agent 211 is located at a different point in an internet protocol (IP) network and discovers EP2P sessions associated with the particular EP2P network passing through that point. The IP network, typically, carries EP2P sessions associated with the particular EP2P network, other EP2P sessions, and non-EP2P sessions. In other words, a plurality of packets flow past each point, typically, including EP2P packets associated with the particular EP2P network, other EP2P packets, and non-EP2P packets.

Figure 3:
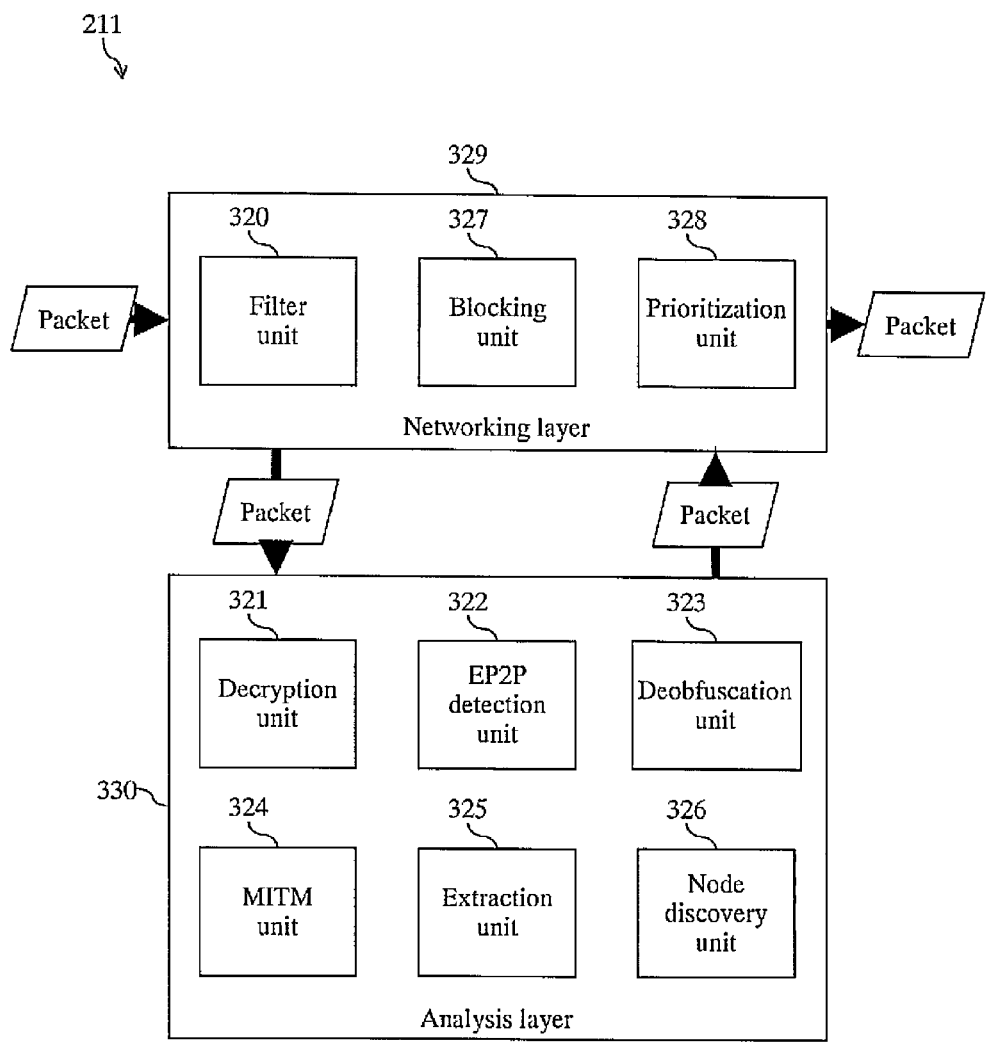
FIG. 3 is a schematic illustration of a detection agent in the detection system of FIG. 2.

With reference to FIG. 3, each detection agent 211 includes a filter unit 320, a decryption unit 321, and an EP2P detection unit 322. Optionally, each detection agent 211 may also include a deobfuscation unit 323, a man-in-the-middle (MITM) unit 324, an extraction unit 325, a node discovery unit 326, a blocking unit 327, and/or a prioritization unit 328. The units included in each detection agent 211 may be implemented as stand-alone software modules, may be grouped into larger software modules, or may be split into smaller units, as desired. The units may also be replicated in more than one software module, as desired.

Preferably, each detection agent 211 is a multilayered detection agent 211 having a networking layer 329 and an analysis layer 330. In such a multilayered detection agent 211, the filter unit 320 and, when present, the blocking unit 327 and the prioritization unit 328 are located in the networking layer 329, whereas the decryption unit 321, the EP2P detection unit 322, and when present, the deobfuscation unit 323, the man-in-the-middle (MITM) unit 324, the extraction unit 325, and the node discovery unit 326 are located in the analysis layer 330. The networking layer 329 receives packets from the IP network and returns packets to the IP network. The analysis layer 330 receives packets from the networking layer 329 and returns packets to the networking layer 329. Moreover, the networking layer 329 retrieves information from the database 212, and the analysis layer 330 stores information in the database 212. Advantageously, such a multilayered detection agent 211 allows higher packet throughput.

Figure 4:
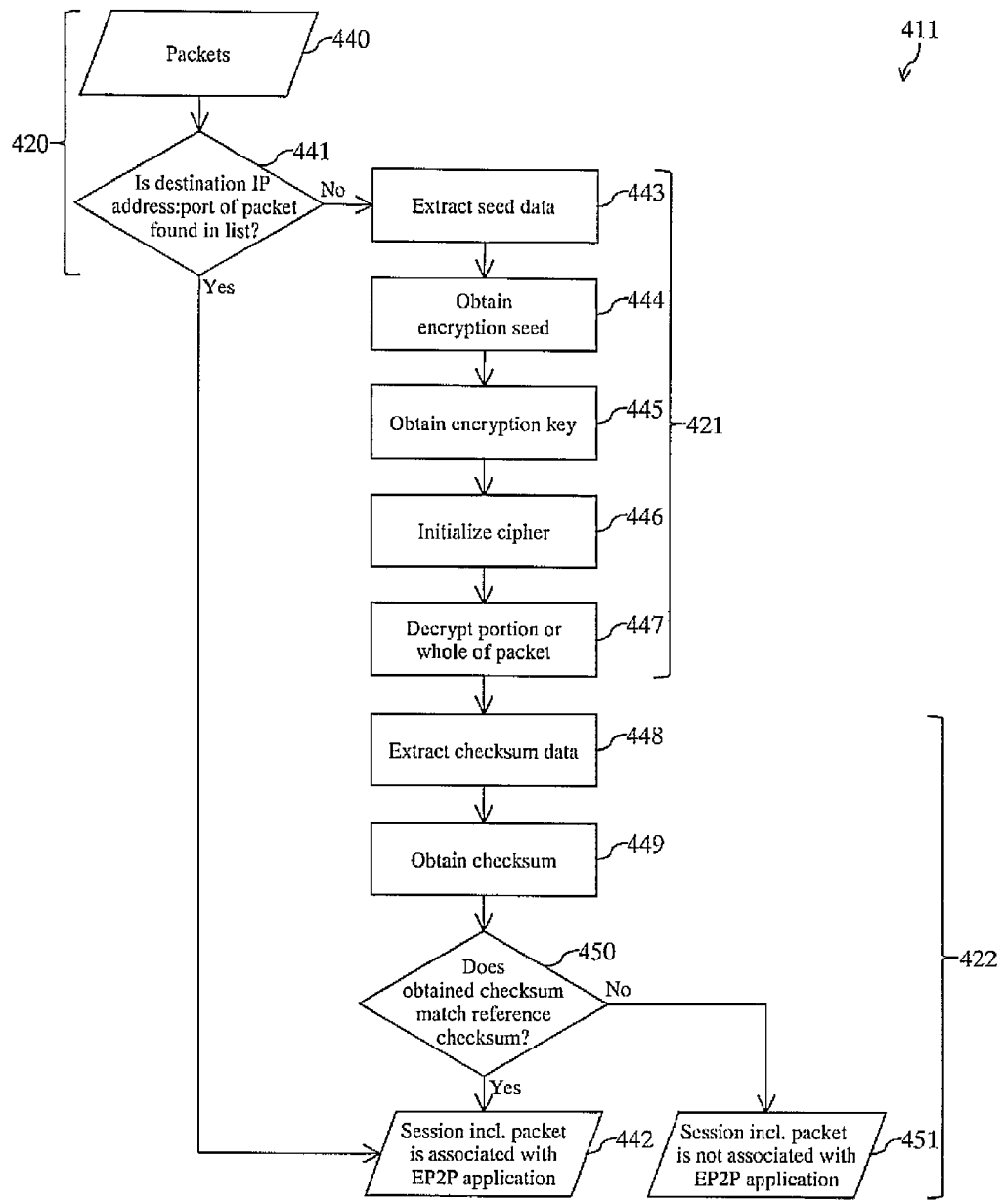
FIG. 4 is a flow diagram of a first exemplary embodiment of a detection agent according to the present invention.

With reference to FIGS. 2 and 4, a first exemplary embodiment of the detection agent 411 includes a filter unit 420, a decryption unit 421, and an EP2P detection unit 422. The detection agent 411 is implemented together with an embodiment of the database 212 including at least a list of IP address and port number combinations of known EP2P nodes associated with the particular EP2P network.

In FIG. 4, the actions performed by the filter unit 420, the decryption unit 421, and the EP2P detection unit 422 are depicted as blocks in a flow diagram. At block 440, the filter unit 420 receives a plurality of packets on route from a plurality of sources to a plurality of destinations in an IP network. That is, the filter unit 420 receives a plurality of packets, which are included in a plurality of sessions. A session is defined herein as a stream of packets having the same source IP address and port number combination, destination IP address and port number combination, transport protocol.

At block 441, the filter unit 420 selects a particular packet, included in a particular session, from the plurality of packets on the basis of a predetermined criterion. Preferably, the predetermined criterion is whether the destination IP address and port number combination of the particular packet is found in the list of IP address and port number combinations of known EP2P nodes associated with the particular EP2P network. Accordingly, the filter unit 420 compares the destination IP address and port number combination of each packet to the list of IP address and port number combinations of known EP2P nodes associated with the particular EP2P network.

If the destination IP address and port number combination of the particular packet is found in the list, the filter unit 420 determines that the particular packet is an EP2P packet associated with the particular EP2P network, and that the particular session including the particular packet is an EP2P session associated with the particular EP2P network at block 442. If the destination IP address and port number combination of the particular packet is not found in the list, the filter unit 420 forwards the particular packet to the decryption unit 421. In other words, the particular packet is selected for detection.

Accordingly, the decryption unit 421 receives the particular packet from the filter unit 420 if the destination IP address and port number combination of the particular packet is not found in the list. In general, no-key decryption is initially performed using only information contained in the particular packet. The decryption process applied to the particular packet is selected on the basis of the transport protocol of the particular packet, as well as the particular EP2P network.

At block 443, the decryption unit 421 extracts seed data associated with the particular EP2P network from the particular packet. The seed data extracted is network-specific and transport-protocol-specific, and may include the source IP address of the particular packet, the source port of the particular packet, the destination IP address of the particular packet, the destination port of the particular packet, the packet identifier (ID) of the particular packet, the initialization vector of the particular packet, or data of a particular byte length at a particular position in the particular packet.

Figure 1A:
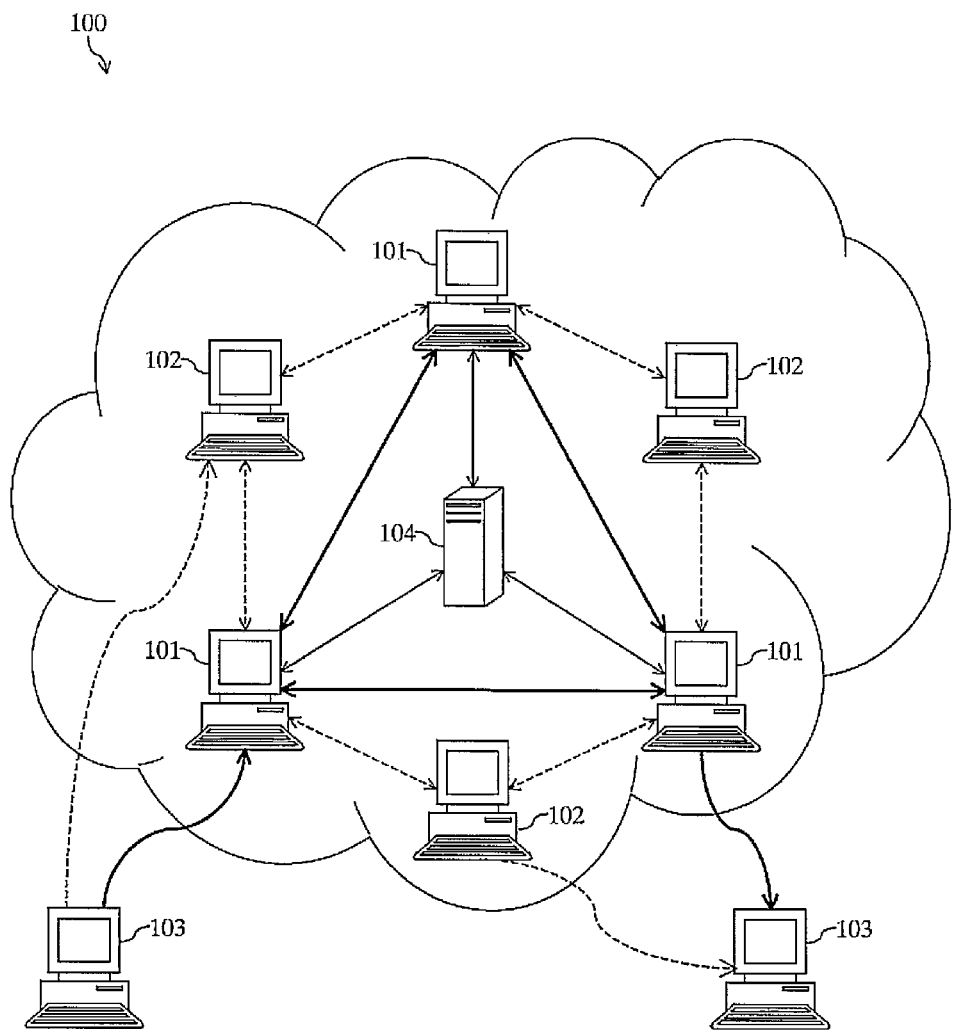
FIG. 1A is a schematic illustration of a prior-art encrypted peer-to-peer (EP2P) network.
Figure 1B:
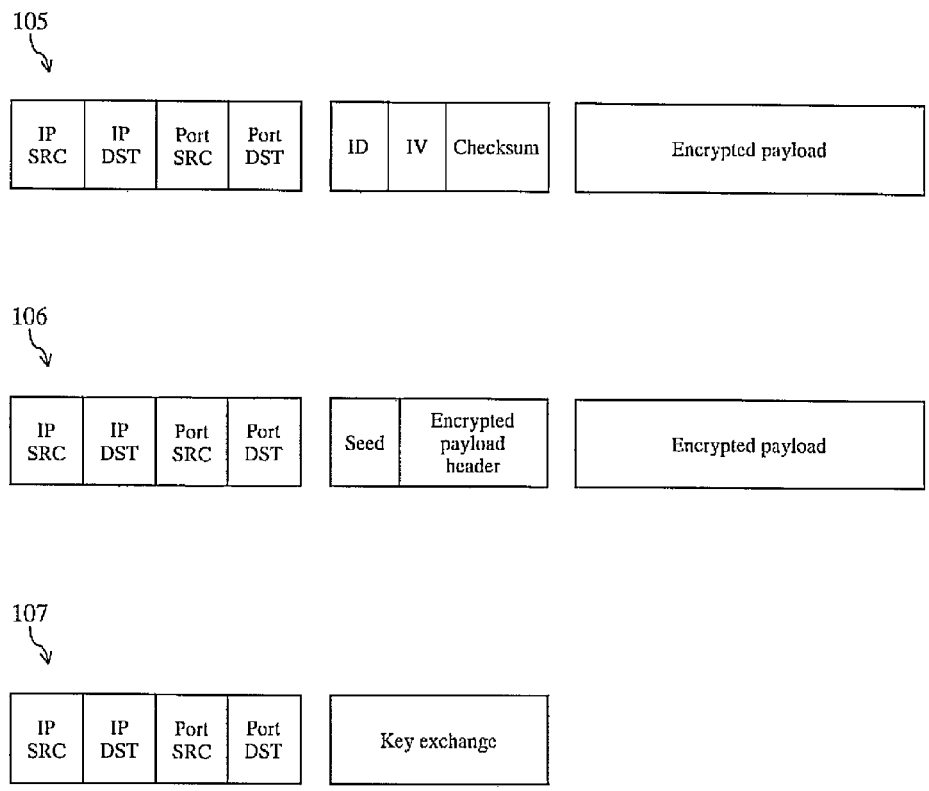
FIG. 1B is a schematic illustration of an exemplary prior-art user datagram protocol (UDP) EP2P packet, an exemplary prior-art transmission control protocol (TCP) EP2P packet, and an exemplary prior-art TCP key exchange packet.

For example, when the particular packet is a user datagram protocol (UDP) packet, such as the exemplary UDP EP2P packet 105 of FIG. 1B, the seed data may consist of the source IP address, the source port, the destination IP address, the destination port, the packet ID, and the initialization vector of the particular packet. For another example, when the particular packet is a transmission control protocol (TCP) packet, such as the exemplary TCP EP2P packet 106 of FIG. 1B, the seed data may consist of data of a particular byte length, extracted from a particular position in the packet payload.

At block 444, the decryption unit 421 obtains an encryption seed from the extracted seed data. The encryption seed may be obtained directly from the extracted seed data, or may be obtained from the extracted seed data by using a seed function associated with the particular EP2P network. Whether a seed function is used is network-specific and transport-protocol-specific. When used, the seed function is also network-specific and transport-protocol-specific, and may include an arithmetic function or a hash function.

For example, when the particular packet is a UDP packet, such as the exemplary UDP EP2P packet 105 of FIG. 1B, the encryption seed may be obtained by performing one or more arithmetic operations on the source IP address, the source port, the destination IP address, the destination port, the packet ID, and the initialization vector of the particular packet. For another example, when the particular packet is a TCP packet, such as the exemplary TCP EP2P packet 106 of FIG. 1B, the encryption seed may be obtained by simply using data of a particular byte length, extracted from a particular position in the packet payload, as the encryption seed.

At block 445, the decryption unit 421 obtains an encryption key from the obtained encryption seed by using a key function associated with the particular EP2P application. The key function is network-specific and may also be transport-protocol-specific. In general, a key function associated with a particular EP2P application may be obtained by the following process. The key function is first identified in the client software associated with the particular EP2P application. The key function is then called and a first input value is provided. The key function may be called by simply connecting to the client software, or by sending specially constructed packets to the client software. A first output value of the key function is obtained for the first input value and is recorded together with the first input value, for instance, in a database. The steps of providing an input value and obtaining an output value are repeated for a large number of input values, i.e. for substantially all possible input values. A function is then constructed that reproduces the obtained output values for the provided input values, which may be used as the key function. An exemplary key function associated with a particular EP2P application is provided in the computer program listing appendix submitted herewith.

At block 446, the decryption unit 421 initializes a cipher associated with the particular EP2P network by using the obtained encryption key. The cipher initialized is network-specific, and may include a block cipher or a stream cipher, for example, the RC4 cipher.

At block 447, the decryption unit 421 decrypts a portion or whole of the particular packet by using the initialized cipher. Whether only a specific portion of the particular packet or the whole particular packet is decrypted is network-specific and transport-protocol-specific. For example, when the particular packet is a UDP packet, such as the exemplary UDP EP2P packet 105 of FIG. 1B, the whole particular packet may be decrypted. For another example, when the particular packet is a TCP packet, such as the exemplary TCP EP2P packet 106 of FIG. 1B, only the encrypted payload header may be decrypted for detection purposes. The decryption unit 421 then forwards the decrypted portion or whole of the particular packet to the EP2P detection unit 422.

Accordingly, the EP2P detection unit 422 receives the decrypted portion or whole of the particular packet from the decryption unit 421. At block 448, the EP2P detection unit 422 extracts checksum data associated with the particular EP2P network from the decrypted portion or whole of the particular packet. The checksum data extracted is network-specific and transport-protocol-specific, and may include data of a particular byte length at a particular position in the decrypted portion or whole of the particular packet, or all the data in the whole decrypted portion or whole of the particular packet. For example, when the particular packet is a UDP packet, such as the exemplary UDP EP2P packet 105 of FIG. 1B, the checksum data may consist of all the data in the decrypted packet payload. For another example, when the particular packet is a TCP packet, such as the exemplary TCP EP2P packet 106 of FIG. 1B, the checksum data may consist of data of a particular byte length, extracted from a particular position in the decrypted payload header.

At block 449, the EP2P detection unit 422 obtains a checksum from the extracted checksum data. The checksum may be obtained directly from the extracted checksum data, or may be obtained from the extracted checksum data by using a checksum function associated with the particular EP2P network. Whether a checksum function is used is network-specific and transport-protocol-specific. When used, the checksum function is also network-specific and transport-protocol-specific, and may include an arithmetic function or a hash function. For example, when the particular packet is a UDP packet, such as the exemplary UDP EP2P packet 105 of FIG. 1B, the checksum may be obtained by applying the crc32 hash function to all the data in the decrypted packet payload. For another example, when the particular packet is a TCP packet, such as the exemplary TCP EP2P packet 106 of FIG. 1B, the checksum may be obtained by simply using data of a particular byte length, extracted from a particular position in the decrypted payload header, as the checksum.

At block 450, the EP2P detection unit 422 compares the obtained checksum with a reference checksum associated with the particular EP2P network. The reference checksum is network-specific and transport-protocol-specific, and may include a data of a particular byte length at a particular position in the particular packet or a hardcoded checksum. For example, when the particular packet is a UDP packet, such as the exemplary UDP EP2P packet 105 of FIG. 1B, the reference checksum may consist of data of a particular byte length, extracted from a particular position in the packet payload. For another example, when the particular packet is a TCP packet, such as the exemplary TCP EP2P packet 106 of FIG. 1B, the reference checksum may consist of a hardcoded checksum not included in the particular packet.

If the obtained checksum does not match the reference checksum, the EP2P detection unit 422 determines that the particular packet is not an EP2P packet associated with the particular EP2P network, and that the particular session including the particular packet is not an EP2P session associated with the particular EP2P network, at block 451.

On the other hand, if the obtained checksum matches the reference checksum, at block 442, the EP2P detection unit 422 determines that the particular packet is an EP2P packet associated with the particular EP2P network, and that the particular session including the particular packet is an EP2P session associated with the particular EP2P network. The EP2P detection unit 422 stores the destination IP address and port number combination of the particular packet in the list of IP address and port number combinations of known EP2P nodes associated with the particular EP2P network, if it is not already present. Preferably, the EP2P detection unit 422 also stores other EP2P session information relating to the particular EP2P session in the database 212, in addition to the destination IP address and port number combination, for example, the source IP address and port number combination, the transport protocol, the establishment time, the duration, the total number of packets, the total number of bytes, the average session speed, a detected timestamp, or a combination thereof.

With reference to FIGS. 2 and 5, a second exemplary embodiment of the detection agent 511 includes a filter unit 520, a decryption unit 521, an EP2P detection unit 522, a deobfuscation unit 523, an MITM unit 524, an extraction unit 525, and a node discovery unit 526. The detection agent 511 is implemented together with an embodiment of the database 212 including at least a list of IP address and port number combinations of known EP2P nodes associated with the particular EP2P network and a list of known EP2P commands associated with the particular EP2P network.

Figure 5A:
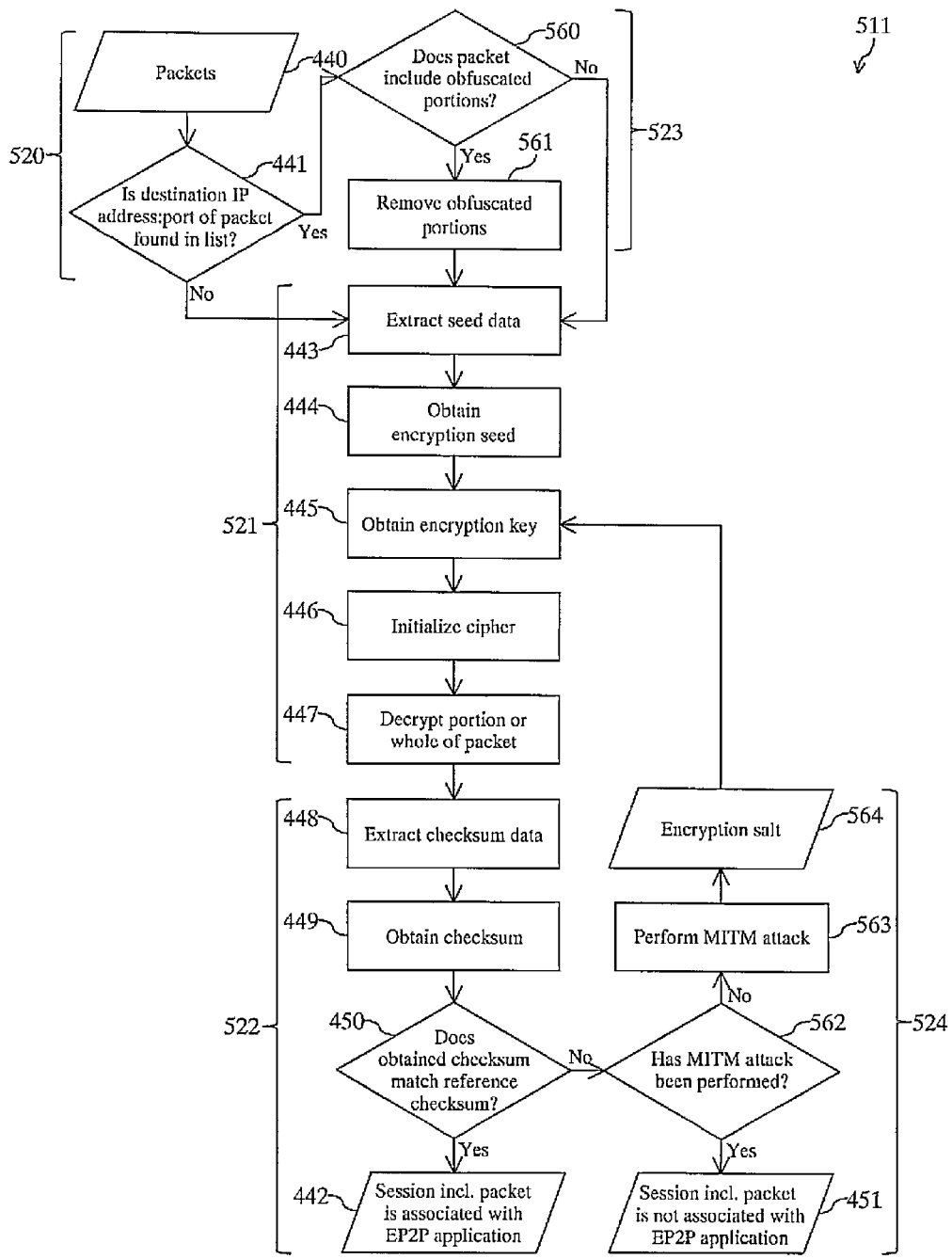
FIG. 5A is a first part of a flow diagram of a second exemplary embodiment of a detection agent according to the present invention.
Figure 5B:
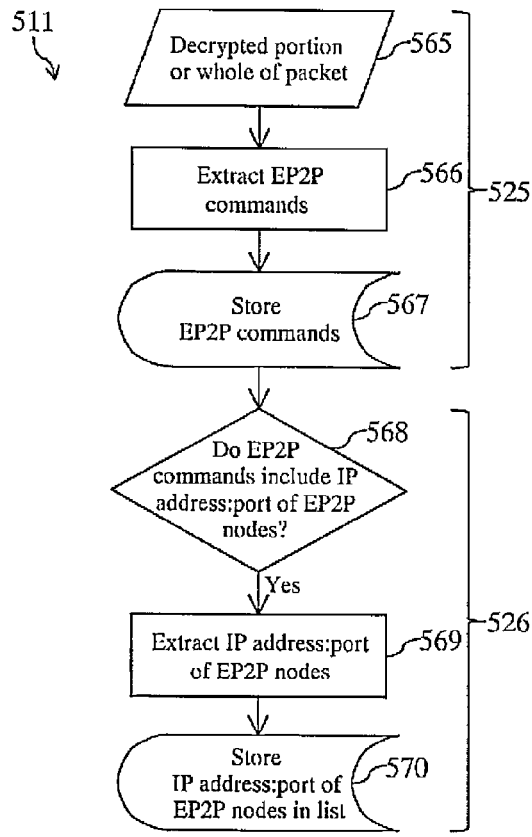
FIG. 5B is a second part of the flow diagram of the detection agent of FIG. 5A.
Figure 6:
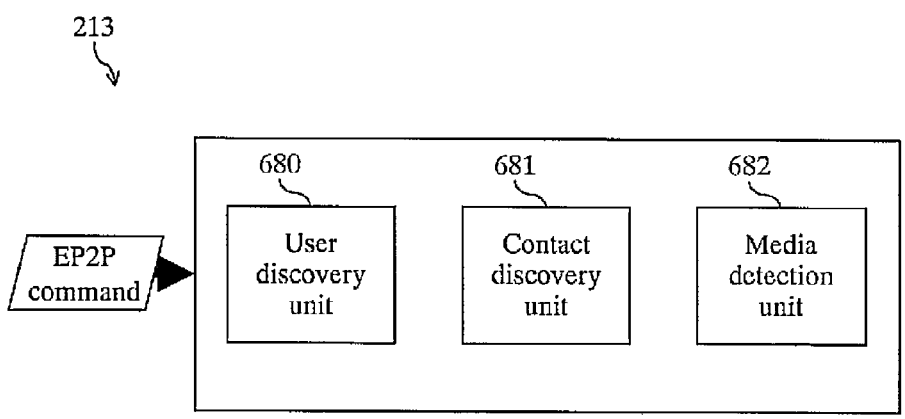
FIG. 6 is a schematic illustration of a correlation module in the detection system of FIG. 2.

In FIG. 5A, the actions performed by the filter unit 520, the decryption unit 521, the EP2P detection unit 522, the deobfuscation unit 523, and the MITM unit 524 are depicted as blocks in a first part of a flow diagram, and in FIG. 5B, the actions performed by the extraction unit 525 and the node discovery unit 526 are depicted as blocks in a second part of the flow diagram.

With particular reference to FIG. 5A, at blocks 440 to 441, the filter unit 520 performs the same actions described heretofore. Preferably, if the destination IP address and port number combination of the particular packet is found in the list of IP address and port number combinations of known EP2P nodes associated with the particular EP2P network, the filter unit 520 forwards the particular packet to the deobfuscation unit 523. In other words, the particular packet is selected for command extraction. If the destination IP address and port number combination of the particular packet is not found in the list, the filter unit 520 forwards the particular packet to the decryption unit 521. In other words, the particular packet is selected for detection, which may be followed by command extraction.

Accordingly, the deobfuscation unit 523 receives the particular packet from the filter unit 520 if the destination IP address and port number combination of the particular packet is found in the list. In general, a check for obfuscation is only performed if the particular packet is suspected or known to be associated with the particular EP2P network, in order to reduce the number of false positives. At block 560, the deobfuscation unit 523 determines whether the particular packet includes any obfuscated portions. For example, the packet payload may include secure sockets layer (SSL) or hypertext transfer protocol (HTTP) portions. If no obfuscated portions are found, the deobfuscation unit 523 forwards the particular packet to the decryption unit 521. If obfuscated portions are found, the deobfuscation unit 523 removes the obfuscated portions from the particular packet, at block 561, and then forwards the particular packet to the decryption unit 521.

Accordingly, the decryption unit 521 receives the particular packet from the filter unit 520 if the destination IP address and port number combination of the particular packet is not found in the list of IP address and port number combinations of known EP2P nodes associated with the particular EP2P network, or from the deobfuscation unit 523 if the destination IP address and port number combination of the particular packet is found in the list. At blocks 443 to 447, the decryption unit 521 performs the same actions described heretofore. In particular, when the particular packet is selected for command extraction, the whole packet is, generally, decrypted.

For increased efficiency, all the packets in the same session may be partially or wholly decrypted by using the same initialized cipher at block 447, without repeating blocks 443 to 446.

At blocks 442 and 448 to 450, the EP2P detection unit 522 performs the same actions described heretofore. If the obtained checksum does not match the reference checksum, the MITM unit 524 is implemented if the destination IP address and port number combination of the particular packet is found in the list of IP address and port number combinations of known EP2P nodes associated with the particular EP2P network. In general, an MITM attack is only performed if the particular packet is suspected or known to be associated with the particular EP2P network, in order to minimize the disruption of normal communication. Moreover, whether an MITM attack is performed is network-specific and transport-protocol-specific. In general, an MITM attack is not performed when the particular packet is a UDP packet. However, an MITM attack may be performed when the particular packet is a TCP packet, such as the exemplary TCP EP2P packet 106 of FIG. 1B, used in conjunction with a key exchange packet, such as the exemplary TCP key exchange packet 107 of FIG. 1B, for example.

At block 562, the MITM unit 524 determines whether an MITM attack has already been performed for the particular packet. For example, this may be accomplished by using a status flag. If an MITM attack has already been performed, the MITM unit 524 determines that the particular packet is not an EP2P packet associated with the particular EP2P network, and that the particular session including the particular packet is not an EP2P session associated with the particular EP2P network, at block 451. If an MITM attack has not already been performed, the MITM unit 524 performs an MITM attack to intercept an encryption salt, at block 563. At block 564, the MITM unit 524 forwards the intercepted encryption salt to the decryption unit 521.

Accordingly, the decryption unit 521 receives the intercepted encryption salt from the MITM unit 524. At block 445, the decryption unit 521 obtains a new encryption key from the intercepted encryption salt and the obtained encryption seed by using the key function. At block 446, the decryption unit 521 reinitializes the cipher by using the new encryption key, and at block 447, the decryption unit 521 decrypts the portion or whole of the particular packet by using the reinitialized cipher. The decryption unit 521 then forwards the newly decrypted portion or whole of the particular packet to the EP2P detection unit 522.

On the other hand, with particular reference to FIG. 5B, if the obtained checksum matches the reference checksum, that is, if the particular packet is determined to be an EP2P packet associated with the particular EP2P network, and the particular session including the particular packet is determined to be an EP2P session associated with the particular EP2P network, the EP2P detection unit 522 forwards the decrypted portion or whole of the particular packet to the extraction unit 525.

Accordingly, at block 565, the extraction unit 525 receives the decrypted portion or whole of the particular packet from the EP2P detection unit 522 if the particular session including the particular packet is determined to be an EP2P session associated with the particular EP2P network. At block 566, the extraction unit 525 extracts EP2P commands associated with the particular EP2P network from the decrypted portion or whole of the particular packet, specifically, from the decrypted packet payload. A command is defined herein as specific bit sequence within the packet payload that carries specific network-related or user-related information. The EP2P commands extracted are network-specific and may, for example, include EP2P discovery commands, EP2P user information commands, EP2P contact information commands, or EP2P media session commands.

At block 567, the extraction unit 525 stores the extracted EP2P commands in the list of known EP2P commands associated with the particular EP2P network and then forwards the extracted EP2P commands to the node discovery unit 526. Preferably, the extraction unit 525 also stores other EP2P command information relating to the extracted EP2P commands in the database 212, in addition to the EP2P commands, for example, received timestamps. Preferably, the extracted EP2P commands are also stored with a link to the destination IP address and port number combination of the particular packet.

Accordingly, the node discovery unit 526 receives the extracted EP2P commands from the extraction unit 525. At block 568, the node discovery unit 526 determines whether the EP2P commands include any IP address and port number combinations of EP2P nodes associated with the particular EP2P network. If any IP address and port number combinations of EP2P nodes are found, the node discovery unit 526 extracts the IP address and port number combinations of EP2P nodes from the EP2P commands, at block 569.

For example, an EP2P discovery command received from an EP2P directory node associated with the particular EP2P network may report other EP2P directory nodes associated with the particular EP2P network. The following is an exemplary EP2P discovery command, from which the IP address and port number combinations, in hexadecimal format, of five new EP2P directory nodes may be extracted:

COMMAND 8:
(OBJLIST, 06):
(DWORD, 00): 00000510
(ADDR, 03): 84EF945F: 15E3
(ADDR, 03): 3E398228: 5277
(ADDR, 03): 54786C8B: 3F40
(ADDR, 03): D33479C5: 5CD7
(ADDR, 03): 4F7FF45A: 04B1
(DWORD, 07): 00000010

At block 570, the node discovery unit 526 stores the extracted IP address and port number combinations in the list of IP address and port number combinations of known EP2P nodes associated with the particular EP2P network, if they are not already present. Preferably, if any of the extracted IP address and port number combinations are already present in the list, the recurrence is indicated in the list, for example, by updating a node status. The node relationship of the extracted IP address and port number combinations to the destination IP address and port number combination of the particular packet is also, preferably, indicated in the list. Preferably, the node discovery unit 526 also stores other EP2P node information relating to the EP2P nodes in the database 212, in addition to IP address and port number combinations and node relationships, for example, node statuses, such as active status, inactive status, or unknown status, node types, such as directory type, relay type, or general type, transport protocols, or a combination thereof. More preferably, the extracted IP address and port number combinations are stored with a link to the EP2P command from which they were extracted.

With reference to FIGS. 2 to 5, any embodiment of the detection agent 211, 411, or 511 allows EP2P sessions associated with the particular EP2P network to be detected. It should be noted that the detection agent 211, 411, or 511 is not necessarily limited to detecting EP2P sessions associated with only one particular EP2P network, but could also be configured for detecting EP2P sessions associated with more than one particular EP2P network. For example, if the particular session including the particular packet is determined to be not associated with a first particular EP2P network, the actions carried out by the appropriate units of the detection agent 211, 411, or 511 may be repeated for a second particular EP2P network, and so on.

Furthermore, in any embodiment of the detection agent 211, 411, or 511, a blocking unit 327 may be included to allow EP2P sessions associated with the particular EP2P network to be selectively blocked, and/or a prioritization unit 328 may be included to allow EP2P sessions associated with the particular EP2P network to be selectively prioritized.

Depending on the embodiment, the blocking unit 327 receives the particular packet from the EP2P detection unit 422 or 522, the node discovery unit 526, or another unit. In some instances, the blocking unit 327 simply blocks the particular packet if the particular session including the particular packet is determined to be an EP2P session associated with the particular EP2P network. In other instances, when the detection agent 211, 411, or 511 is implemented together with the administration console 214, the blocking unit 327 blocks the particular packet if the particular session including the particular packet is determined to be an EP2P session associated with the particular EP2P network, in accordance with one or more control policies set via the administration console 214. For example, the particular packet may be blocked on the basis of client identifier ID, source IP address, source port number, destination IP address, destination port number, node geographical location, or a combination thereof.

Depending on the embodiment, the prioritization unit 328 receives the particular packet from the EP2P detection unit 422 or 522, the node discovery unit 526, or another unit. In some instances, the prioritization unit 328 simply assigns a particular priority level to the particular packet if the particular session including the particular packet is determined to be an EP2P session associated with the particular EP2P network. In other instances, when the detection agent 211, 411, or 511 is implemented together with the administration console 214, the prioritization unit 328 assigns a priority level to the particular packet if the particular session including the particular packet is determined to be an EP2P session associated with the particular EP2P network, in accordance with one or more control policies set via the administration console 214. For example, the particular packet may be assigned a priority level on the basis of client ID, source IP address, source port number, destination IP address, destination port number, node geographical location, or a combination thereof.

With reference to FIGS. 2, 3, 5, and 6, any embodiment of the detection agent 211 or 511 including the extraction unit 325 or 525 may be implemented together with the correlation module 213. The correlation module 213 enables the collection of user information, contact information, and media session information associated with the particular EP2P network.

The correlation module 213 includes a user discovery unit 680, a contact discovery unit 681, and/or a media detection unit 682. The units included in the correlation module 213 may be implemented as stand-alone software modules, may be grouped into larger software modules, or may be split into smaller units, as desired. The units may also be replicated in more than one software module, as desired. In some instances, the correlation module 213 or units thereof may be included in the detection agent 211 or 511.

With reference to FIGS. 2, 3, 5, and 7, an exemplary embodiment of the correlation module 713 includes a user discovery unit 780, a contact discovery unit 781, and a media detection unit 782. The correlation module 713 is implemented together with an embodiment of the detection agent 211 or 511 including the extraction unit 325 or 525, and an embodiment of the database 212 including at least a list of known EP2P commands associated with the particular EP2P network.

Figure 7:
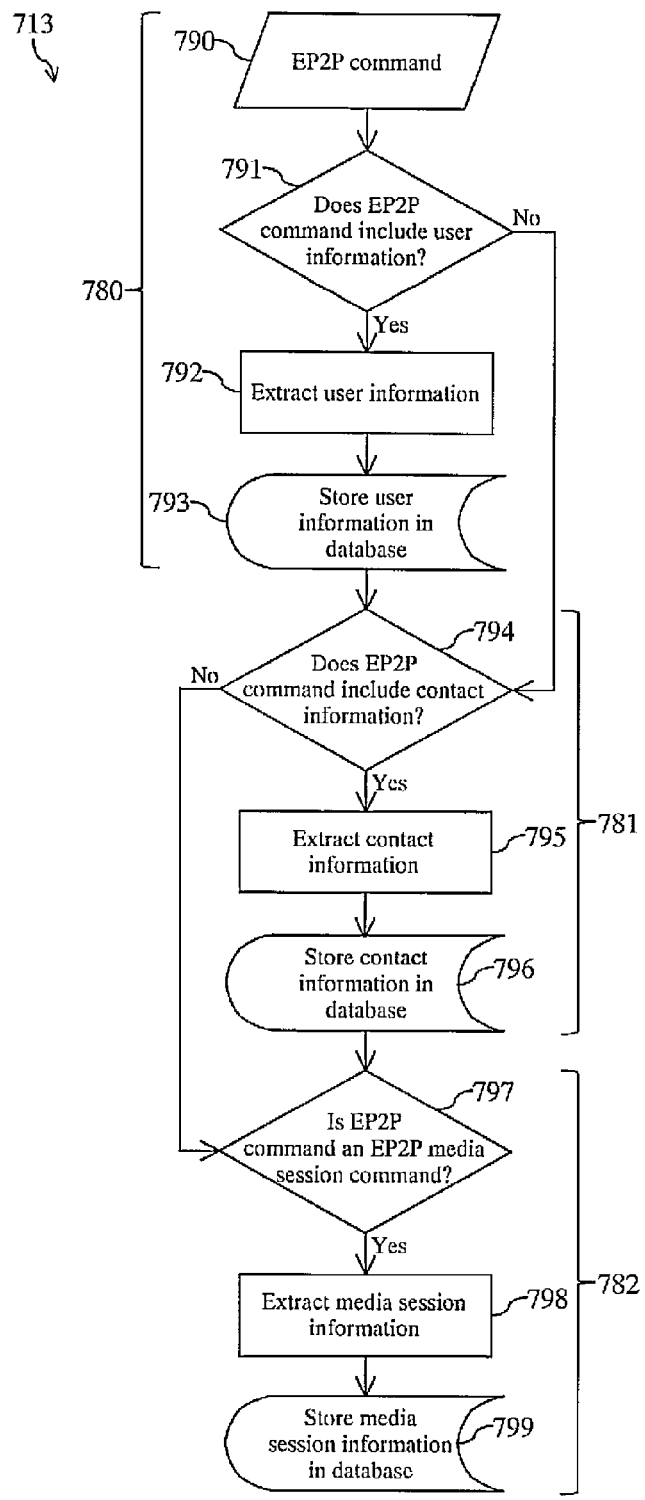
FIG. 7 is a flow diagram of an exemplary embodiment of a correlation module according to the present invention.

In FIG. 7, the actions performed by the user discovery unit 780, the contact discovery unit 781, and the media detection unit 782 are depicted as blocks in a flow diagram. At block 790, the user discovery unit 780 retrieves an EP2P command from the list of known EP2P commands associated with the particular EP2P network in the database 212. At block 791, the user discovery unit 780 determines whether the EP2P command includes any user information associated with the particular EP2P network. The user information, typically, includes a user ID of an initial user. For example, the EP2P command may be an EP2P user registration command including a user ID of an initial user. The user information may also, for example, include a real name, a user name, an age, a country, a language, an email address, a client ID, a public IP address and port number combination, a private IP address and port number combination, a geographical location, hardware information, software information, or a combination thereof.

If any user information is found, the user discovery unit 780 extracts the user information from the EP2P command at block 792. At block 793, the user discovery unit 780 stores the extracted user information in the database 212, if it is not already present, and then forwards the EP2P command to the contact discovery unit 781. Preferably, the extracted user information is stored with a link to the EP2P command from which it was extracted and also with a link to the destination IP address and port number combination of the particular packet.

Accordingly, the contact discovery unit 781 receives the EP2P command from the user discovery unit 780. At block 794, the contact discovery unit 781 determines whether the EP2P command includes any contact information associated with the particular EP2P network. The contact information, typically, includes a user ID or a public IP address and port number combination of a contact of the initial user. For example, the EP2P command may be an EP2P contact status request command from the initial user including a public IP address and port number combination of a contact of the initial user. The contact information may also, for example, include a client ID, a private IP address and port number combination, hardware information, software information, or a combination thereof.

If any contact information is found, the contact discovery unit 781 extracts the contact information from the EP2P command at block 795. At block 796, the contact discovery unit 781 stores the extracted contact information in the database 212, if it is not already present, and then forwards the EP2P command to the media detection unit 782. Preferably, the extracted contact information is stored with a link to the EP2P command from which it was extracted and also with a link to the destination IP address and port number combination of the particular packet. More preferably, the extracted contact information is also stored with a link to the extracted user information.

Accordingly, the media detection unit 782 receives the EP2P command from the contact discovery unit 781. At block 797, the media detection unit 782 determines whether the EP2P command is an EP2P media session command, for example, an EP2P media session setup command or an EP2P quality of service (QoS) command. In some instances, whether the EP2P command is an EP2P media session command is determined by detecting an incremental counter change between the packet including the EP2P command and adjacent packets in the EP2P session. In other instances, whether the EP2P command is an EP2P media session command is determined by analyzing the EP2P command.

If the EP2P command is determined to be a media session command, the media detection unit 782 extracts media session information from the EP2P command, at block 798. For example, the media session information may include participant information, a network path, or a media session type, such as voice type, video type, or file transfer type. The media session type may be determined from the transport protocol, the packet sizes, and the average session speed of the EP2P session.

At block 799, the media detection unit 782 stores the extracted media session information in the database 212, if it is not already present. In some instances, the media detection unit 782 may generate a call detail record (CDR) for the media session. Preferably, the extracted media session information is stored with a link to the EP2P command from which it was extracted and also with a link to the destination IP address and port number combination of the particular packet.

By correlating the user information collected by the user discovery unit 780, the contact information collected by the contact discovery unit 781, and the media session information collected by the media detection unit 782, the correlation module 713 enables the identification of the users and their contacts participating in given media sessions.

With reference to FIGS. 2 to 7, any embodiment of the detection agent 211, 411, or 511 may be implemented together with the administration console 214, which provides reporting and management capabilities. Generally, the administration console 214 presents a user interface, preferably, a graphical user interface (GUI) on a display device. In some instances, the administration console 214 or parts thereof may be included in the detection agent 211 or 511.

The administration console 214 retrieves and reports information stored in the database 212 by the detection agent 211, 411, or 511 and/or the correlation module 213 or 713. For example, the information retrieved and reported may include: EP2P session information, such as destination IP address and port number combinations, source IP address and port number combinations, transport protocols, establishment times, durations, total numbers of packets, total numbers of bytes, average session speeds, and detected timestamps, collected by the detection agent 211, 411, or 511; EP2P command information, such as EP2P commands and received timestamps, collected by the detection agent 211 or 511; EP2P node information, such as IP address and port number combinations, node relationships, node statuses, node types, and transport protocols, collected by the detection agent 211 or 511; user information, such as user IDs, client IDs, public IP address and port number combinations, private IP address and port number combinations, hardware information, and software information, collected by the correlation module 213 or 713; contact information, such as user IDs, client IDs, public IP address and port number combinations, private IP address and port number combinations, hardware information, and software information, collected by the correlation module 213 or 713; media session information, such as participant information, network paths, and media session types, collected by the correlation module 213 or 713; or a combination thereof. The information may be displayed in graphical or tabular format.

The administration console 214 also allows information to be provided, for instance, by a system administrator, to the detection agent 211, 411, or 511, and/or the correlation module 213 or 713. For example, the administration console 214 may be used to provide control policies for blocking and/or prioritization to the detection agent 211, 411, or 511. The administrative console 214 may also, for example, be used to control the detection of EP2P sessions and the collection of EP2P session information, EP2P command information, and/or EP2P node information by the detection agent 211, 411, or 511, and/or to control the collection of user information, contact information, and/or media session information by the correlation module 213 or 713.

In summary, the present invention provides methods and detection systems for detecting EP2P sessions associated with a particular EP2P network. In various embodiments, the present invention allows: the real-time detection of EP2P sessions associated with the particular EP2P network; the partial or complete decryption of EP2P packets associated with the particular EP2P network; the discovery of EP2P nodes associated with the particular EP2P network; the collection, storage, and reporting of EP2P session information, EP2P command information, and/or EP2P node information; the selective blocking and/or prioritization of EP2P sessions; and the collection, storage, and reporting of user information, contact information, and/or media session information.

Of course, numerous other embodiments may be envisaged without departing from the spirit and scope of the invention.

We claim:

1. A detection system for detecting encrypted peer-to-peer (EP2P) sessions associated with a particular EP2P network, embodied in one or more non-transitory computer-readable storage media and executable by one or more processors, comprising: at least one microprocessor
   a database including:
      a list of internet protocol (IP) address and port number combinations of known EP2P nodes associated with the particular EP2P network; and
      a list of known EP2P commands associated with the particular EP2P network; and one or more detection agents, each detection agent including:
      a filter unit for receiving a plurality of packets on route from a plurality of sources to a plurality of destinations in an IP network, for comparing a destination IP address and port number combination of each of the plurality of packets to the list of IP address and port number combinations of known EP2P nodes associated with the particular EP2P network, and for selecting a particular packet from the plurality of packets on the basis of a predetermined criterion, wherein the predetermined criterion is whether the destination IP address and port number combination of the particular packet is found in the list of IP address and port number combinations of known EP2P nodes associated with the particular EP2P network; a decryption unit for receiving the particular packet from the filter unit if the destination IP address and port number combination of the particular packet is not found in the list of IP address and port number combinations of known EP2P nodes associated with the particular EP2P network, and for performing no-key decryption using only information contained in the particular packet by: extracting seed data associated with the particular EP2P network from the particular packet, obtaining an encryption seed from the extracted seed data, obtaining an encryption key from the obtained encryption seed with a key function associated with the particular EP2P network, initializing a cipher associated with the particular EP2P network with the obtained encryption key, and decrypting a portion or whole of the particular packet with the initialized cipher; an EP2P detection unit for receiving the decrypted portion or whole of the particular packet from the decryption unit, for extracting checksum data associated with the particular EP2P network from the decrypted portion or whole of the particular packet, for obtaining a checksum from the extracted checksum data, for comparing the obtained checksum with a reference checksum associated with the particular EP2P network, for determining that a session including the particular packet is an EP2P session associated with the particular EP2P network if the obtained checksum matches the reference checksum, and for storing the destination IP address and port number combination of the particular packet in the list of IP address and port number combinations of known EP2P nodes associated with the particular EP2P network if the obtained checksum matches the reference checksum and if the IP address and port number combination of the particular packet is not already found in the list of IP address and port number combinations of known EP2P nodes associated with the particular EP2P network; and an extraction unit for receiving the decrypted portion or whole of the particular packet from the EP2P detection unit if the session including the particular packet is determined to be an EP2P session associated with the particular EP2P network, for extracting EP2P commands associated with the particular EP2P network from the decrypted portion or whole of the particular packet, wherein the EP2P commands are bit sequences within the particular packet's payload that carry network-related or user-related information, and for storing the extracted EP2P commands in the list of known EP2P commands associated with the particular EP2P network.

2. The detection system of claim 1, wherein the detection system is a distributed detection system comprising a plurality of detection agents;
   wherein the database is a centralized database accessible by the plurality of detection agents; and
   wherein each detection agent is located at a different point in the IP network, and is for detecting EP2P sessions associated with the particular EP2P network passing through that point.

3. The detection system of claim 1, wherein each detection agent further includes:
   a deobfuscation unit for receiving the particular packet from the filter unit if the IP address and port number combination of the particular packet is found in the list of IP address and port number combinations of known EP2P nodes associated with the particular EP2P network, for determining whether the particular packet includes any obfuscated padding portions, and for removing any obfuscated padding portions from the particular packet prior to performing no-key decryption;
   wherein the decryption unit is also for receiving the particular packet from the deobfuscation unit if the IP address and port number combination of the particular packet is found in the list of IP address and port number combinations of known EP2P nodes associated with the particular EP2P network.

4. The detection system of claim 1, wherein each detection agent further includes:
- a man-in-the-middle (MITM) unit for performing an MITM attack to intercept an encryption salt if the obtained checksum does not match the reference checksum and if the IP address and port number combination of the particular packet is found in the list of IP address and port number combinations of known EP2P nodes associated with the particular EP2P network, and for forwarding the intercepted encryption salt to the decryption unit; and
- wherein the decryption unit is also for obtaining a new encryption key from the intercepted encryption salt and the obtained encryption seed with the key function, for reinitializing the cipher with the new encryption key, and for decrypting the portion or whole of the particular packet with the reinitialized cipher.

5. The detection system of claim 1, wherein each detection agent further includes:
- a node discovery unit for receiving the extracted EP2P commands from the extraction unit, for determining whether the extracted EP2P commands include any IP address and port number combinations of EP2P nodes associated with the particular EP2P network, for extracting any IP address and port number combinations of EP2P nodes, and for storing the extracted IP address and port number combinations of EP2P nodes in the list of IP address and port number combinations of known EP2P nodes associated with the particular EP2P network.

6. The detection system of claim 1, further comprising:
a correlation module including:
- a user discovery unit for retrieving an EP2P command from the list of known EP2P commands associated with the particular EP2P network in the database, for determining whether the EP2P command includes any user information associated with the particular EP2P network, for extracting any user information from the EP2P command, and for storing the extracted user information in the database.

7. The detection system of claim 6, wherein the correlation module further includes:
- a contact discovery unit for receiving the EP2P command from the user discovery unit, for determining whether the EP2P command includes any contact information associated with the particular EP2P network, for extracting any contact information from the EP2P command, and for storing the extracted contact information in the database with a link to the extracted user information.

8. The detection system of claim 7, wherein the correlation module further includes:
- a media detection unit for receiving the EP2P command from the contact discovery unit determining whether the EP2P command is a media session setup command, for extracting media session information from the EP2P command if the EP2P command is a media session setup command, and for storing the extracted media session information in the database.

9. The detection system of claim 1, wherein each detection agent further includes:
- a blocking unit for blocking the particular packet if the session including the particular packet is determined to be an EP2P session associated with the particular EP2P network.

10. The detection system of claim 1, further comprising:
an administration console for setting a priority level for the particular EP2P network;
wherein each detection agent further includes:
- a prioritization unit for assigning the particular packet the priority level set for the particular EP2P network if the session including the particular packet is determined to be an EP2P session associated with the particular EP2P network.

11. A method of detecting EP2P sessions associated with a particular EP2P network, executed by one or more processors, comprising:
storing a list of IP address and port number combinations of known EP2P nodes associated with the particular EP2P network and a list of known EP2P commands associated with the particular EP2P network in a database;
receiving a plurality of packets on route from a plurality of sources to a plurality of destinations in an IP network;
comparing a destination IP address and port number combination of each of the plurality of packets to the list of IP address and port number combinations of known EP2P nodes associated with the particular EP2P network;
selecting a particular packet from the plurality of packets on the basis of a predetermined criterion, wherein the predetermined criterion is whether the destination IP address and port number combination of the particular packet is found in the list of IP address and port number combinations of known EP2P nodes associated with the particular EP2P network;
performing no-key decryption using only information contained in the particular packet if the destination IP address and port number combination of the particular packet is not found in the list of IP address and port number combinations of known EP2P nodes associated with the particular EP2P network, by:
extracting seed data associated with the particular EP2P network from the particular packet;
obtaining an encryption seed from the extracted seed data;
obtaining an encryption key from the obtained encryption seed by using a key function associated with the particular EP2P network;
initializing a cipher associated with the particular EP2P network by using the obtained encryption key; and
decrypting a portion or whole of the particular packet by using the initialized cipher;
extracting checksum data associated with the particular EP2P network from the decrypted portion or whole of the particular packet;
obtaining a checksum from the extracted checksum data;
comparing the obtained checksum with a reference checksum associated with the particular EP2P network;
determining that a session including the particular packet is an EP2P session associated with the particular EP2P network if the obtained checksum matches the reference checksum;
storing the destination IP address and port number combination of the particular packet in the list of IP address and port number combinations of known EP2P nodes associated with the particular EP2P network if the obtained checksum matches the reference checksum and if the IP address and port number combination of the particular packet is not already found in the list of IP address and port number combinations of known EP2P nodes associated with the particular EP2P network;
extracting EP2P commands associated with the particular EP2P network from the decrypted portion or whole of the particular packet if the session including the particular packet is determined to be an EP2P session associated with the particular EP2P network, wherein the EP2P commands are bit sequences within the particular packet's payload that carry network-related or user-related information; and storing the extracted EP2P commands in the list of known EP2P commands associated with the particular EP2P network.

12. The method of claim 11, further comprising:
removing any obfuscated padding portions from the particular packet prior to performing no-key decryption.

13. The method of claim 11, further comprising:
performing an MITM attack to intercept an encryption salt if the obtained checksum does not match the reference checksum;
obtaining a new encryption key from the intercepted encryption salt and the obtained encryption seed by using the key function;
reinitializing the cipher by using the new encryption key; and
decrypting the portion or whole of the particular packet by using the reinitialized cipher.

14. The method of claim 11, further comprising:
extracting any IP address and port number combinations of EP2P nodes from the extracted EP2P commands.

15. The method of claim 11, further comprising:
blocking the particular packet if the session including the particular packet is determined to be an EP2P session associated with the particular EP2P network.

16. The method of claim 11, further comprising:
assigning the particular packet a priority level set for the particular EP2P network if the session including the particular packet is determined to be an EP2P session associated with the particular EP2P network.

17. One or more non-transitory computer-readable storage media comprising instructions that, when executed by one or more processors, perform a method of detecting EP2P sessions associated with a particular EP2P network, executed by one or more processors, the method comprising:
storing a list of IP address and port number combinations of known EP2P nodes associated with the particular EP2P network and a list of known EP2P commands associated with the particular EP2P network in a database;
receiving a plurality of packets on route from a plurality of sources to a plurality of destinations in an IP network;
comparing a destination IP address and port number combination of each of the plurality of packets to the list of IP address and port number combinations of known EP2P nodes associated with the particular EP2P network;
selecting a particular packet from the plurality of packets on the basis of a predetermined criterion, wherein the predetermined criterion is whether the destination IP address and port number combination of the particular packet is found in the list of IP address and port number combinations of known EP2P nodes associated with the particular EP2P network;
performing no-key decryption using only information contained in the particular packet if the destination IP address and port number combination of the particular packet is not found in the list of IP address and port number combinations of known EP2P nodes associated with the particular EP2P network, by:
extracting seed data associated with the particular EP2P network from the particular packet;
obtaining an encryption seed from the extracted seed data;
obtaining an encryption key from the obtained encryption seed by using a key function associated with the particular EP2P network;
initializing a cipher associated with the particular EP2P network by using the obtained encryption key; and
decrypting a portion or whole of the particular packet by using the initialized cipher;
extracting checksum data associated with the particular EP2P network from the decrypted portion or whole of the particular packet;
obtaining a checksum from the extracted checksum data;
comparing the obtained checksum with a reference checksum associated with the particular EP2P network;
determining that a session including the particular packet is an EP2P session associated with the particular EP2P network if the obtained checksum matches the reference checksum;
storing the destination IP address and port number combination of the particular packet in the list of IP address and port number combinations of known EP2P nodes associated with the particular EP2P network if the obtained checksum matches the reference checksum and if the IP address and port number combination of the particular packet is not already found in the list of IP address and port number combinations of known EP2P nodes associated with the particular EP2P network;
extracting EP2P commands associated with the particular EP2P network from the decrypted portion or whole of the particular packet if the session including the particular packet is determined to be an EP2P session associated with the particular EP2P network, wherein the EP2P commands are bit sequences within the particular packet's payload that carry network-related or user-related information; and
storing the extracted EP2P commands in the list of known EP2P commands associated with the particular EP2P network.

* * * * *